US011216518B2

(12) United States Patent
Manning et al.

(10) Patent No.: US 11,216,518 B2
(45) Date of Patent: *Jan. 4, 2022

(54) SYSTEMS AND METHODS OF PROVIDING RECOMMENDATIONS OF CONTENT ITEMS

(71) Applicant: RCRDCLUB Corporation, New York, NY (US)

(72) Inventors: Damian Franken Manning, New York, NY (US); Omar Emad Shams, Jersey City, NJ (US); Samuel Evan Sandberg, Brooklyn, NY (US)

(73) Assignee: RCRDCLUB Corporation, New York, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/420,282

(22) Filed: May 23, 2019

(65) Prior Publication Data

US 2019/0278819 A1  Sep. 12, 2019

Related U.S. Application Data

(63) Continuation of application No. 15/225,668, filed on Aug. 1, 2016, now Pat. No. 10,380,209.

(60) Provisional application No. 62/199,632, filed on Jul. 31, 2015.

(51) Int. Cl.
*G06F 16/00* (2019.01)
*G06F 16/9535* (2019.01)
*G06F 16/435* (2019.01)
*G06F 16/635* (2019.01)

(52) U.S. Cl.
CPC ........ *G06F 16/9535* (2019.01); *G06F 16/435* (2019.01); *G06F 16/635* (2019.01)

(58) Field of Classification Search
CPC ... G06F 16/9535; G06F 16/435; G06F 16/635
USPC ........................................................ 707/734
See application file for complete search history.

(56) References Cited

U.S. PATENT DOCUMENTS

| 7,668,821 | B1 | 2/2010 | Donsbach |
| 9,129,214 | B1* | 9/2015 | Gomez-Uribe ........ G06N 7/005 |
| 10,380,209 | B2* | 8/2019 | Manning ............... G06F 16/435 |
| 2007/0118498 | A1* | 5/2007 | Song ...................... G06F 16/34 |
| 2008/0189232 | A1 | 8/2008 | Dunning |
| 2012/0331025 | A1* | 12/2012 | Gemulla ................. G06F 17/11 |
| | | | 708/200 |
| 2013/0151383 | A1 | 6/2013 | Gancarz |
| 2014/0129500 | A1* | 5/2014 | Nice .................. G06Q 30/0631 |
| | | | 706/46 |

(Continued)

OTHER PUBLICATIONS

International Search Report and Written Opinion dated Nov. 3, 2016 as received in Application No. PCT/US2016/045053.

*Primary Examiner* — Thanh-Ha Dang
(74) *Attorney, Agent, or Firm* — Butzel Long (57) ABSTRACT

A method of recommending content items includes obtaining vector representations of items based on a matrix of items versus item users that indicates item use by the users, reducing each of the vector representations to a two-dimensional space, creating clusters having cluster centers using one or more mixture models based on the reduced vector representations, using the cluster centers for one or more mixture models to create discrete categories to which items can be assigned and providing one or more recommendations to a first user based on the item assignments within the discrete categories.

20 Claims, 4 Drawing Sheets

(56) References Cited

U.S. PATENT DOCUMENTS

| | | | |
|---|---|---|---|
| 2014/0195544 A1* | 7/2014 | Whitman | G06F 16/435 707/744 |
| 2015/0032449 A1* | 1/2015 | Sainath | G10L 15/16 704/235 |
| 2015/0073932 A1* | 3/2015 | Nice | G06Q 30/0631 705/26.7 |
| 2015/0095407 A1* | 4/2015 | Li | G06F 16/95 709/203 |
| 2015/0112801 A1* | 4/2015 | Nice | G06Q 30/0269 705/14.53 |
| 2015/0278350 A1* | 10/2015 | Nice | G06F 16/335 707/754 |

\* cited by examiner

SYSTEMS AND METHODS OF PROVIDING RECOMMENDATIONS OF CONTENT ITEMS

BACKGROUND

Many content systems use genre labels to organize and present content to users. For example, a music streaming service can use genre labels such as rap, pop, and country. Such genre labels categorize content into groups which are intended to allow a perusing user to chance across additional content creators, e.g. musicians, authors, etc., that the user might find interesting.

BRIEF SUMMARY

According to an embodiment of the disclosed subject matter, a method includes obtaining vector representations of items via collaborative filtering based on a matrix of items versus item users, reducing each of the vector representations to a two-dimensional space, creating clusters having cluster centers using one or more mixture models based on the reduced vector representations, using the cluster centers for one or more mixture models to create discrete categories to which items can be assigned, and providing one or more recommendations to a first user based on the item assignments within the discrete categories. An example of a mixture model is a Gaussian mixture model, but other distributions can be used.

The one or more mixture models can be used to determine a probability score that indicates a probability of any given item being assigned to any of the discrete categories.

The vector representations can be reduced to a two-dimensional space using t-distributed stochastic neighbor embedding (t-SNE).

The probability score for a particular item belonging to a particular category i can be factored based on a weight calculation as follows:

$$weight_i = \exp\left(-\frac{(\vec{x} - \vec{\mu_i})^2}{2\sigma_i^2}\right)$$

where x is a location of the t-SNE projected particular item vector, $\mu_i$ is a center or mean vector of category i, and $\sigma_i$ is a standard deviation of cluster of category i.

The clusters can be created using a nonparametric process that does not require a predefined number of clusters. The clusters can be created using one or more Dirichlet process mixture models. The items can correspond to, for example, musicians, albums, books, or other digital media. The recommendation can be provided to the first user as part of a streaming music service. The collaborative filtering matrix can be based on data obtained about the first user from a third party service.

Additional features, advantages, and embodiments of the disclosed subject matter can be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, etc. In other instances, well-known structures and devices are shown in block diagram form to facilitate describing the subject disclosure.

In a system containing diverse, creative content items that are intended to be presented to users for selection, grouping content items by genre provides an indication of relationship among grouped items. A conventional item presentation system (e.g., an online book store or online music store) can therefore operate under the assumption that a user interested in one item in a given genre can be interested in another item in the same genre. Various presentation rules can revolve around this concept, particularly where presentation space is limited and the system goal is to present the user with a display of items that the user is most likely to select and/or purchase.

However, the disclosed subject matter will show that information representing a more accurate interconnectivity among users and groups of items, regardless of genre, can be generated and/or captured. Consequently, a conventional system that presents creative content items (e.g., songs, movies, books, etc.) to a user using presentation rules based on genre inherently limits the presentation. The disclosed embodiments improves the art by providing a system based on rules that capture real life interconnectivity between users and groups of items.

To provide an example, certain rap genre artists and pop genre artists can produce content items that are listened to by the same user. However, if a user searching for new content views a rap artist/song, a conventional system that presents songs and/or artists limited by genre can fail to present potentially highly relevant pop songs and/or artists that the user may be interested in.

Conventionally labeled genres fail to capture how people actually listen to music. For example, people are often listen across genres and play popular hip-hop alongside popular electronic music. Many popular artists transcend several of the traditional genres.

Embodiments disclosed herein improves the technology behind online stores, music streaming services, and other industries that utilize genre categorization by providing an improved consumption-driven categorization that can form the basis for item presentation and/or recommendation rules. The disclosed consumption-driven categorization can assign partial membership of any item to multiple categories as determined by a probability score. Items can therefore be members of two or more categories, and the categories themselves can provide a more accurate reflection of the consumer population's tastes and actual preferred groupings.

Figure 1:
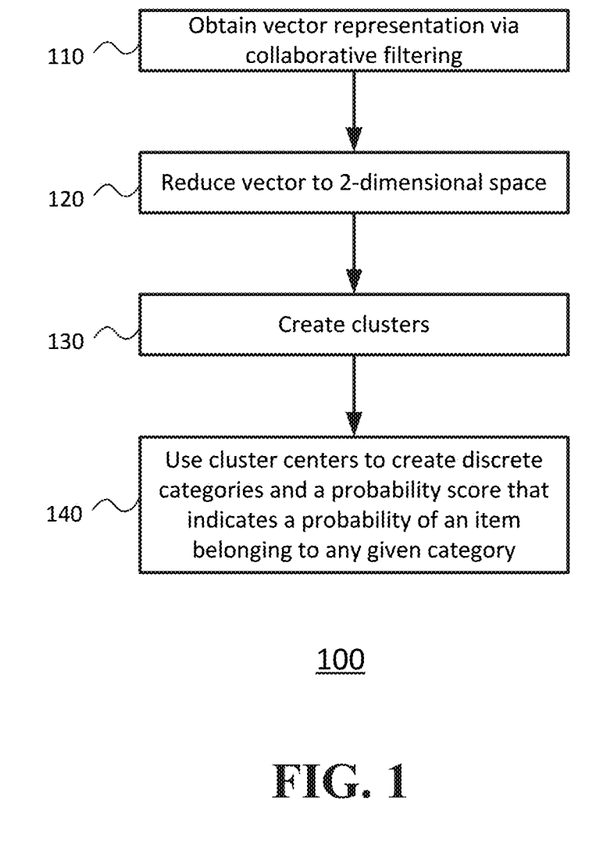
FIG. 1 shows a flowchart of process for categorizing items according to an embodiment of the disclosed subject matter.

FIG. 1 is a flowchart of a process 100 of one embodiment of the disclosed subject matter. The operations of process 100 can be implemented, for example, in an online content provider system. In this embodiment, a set of item creators (hereinafter, "artists") have created a set of creative content items (hereinafter, "items") that are intended to be available for presentation to one or more "users" who have a desire to find items of interest for consumption (i.e., reading, viewing, listening, purchasing, etc.). At operation 110, vector representations of the artists are generated based on a matrix of users versus artists that indicates usage. For example, an entry of "1" can indicate that a user has consumed an item created by a given artist while an entry of "0" can indicate that a user has not consumed an item created by the artist.

In one embodiment, collaborative filtering (CF) can be used to construct a user vector $\vec{v}_u$ and an item vector $\vec{v}_i$, for all users u and items i respectively. In this case, "items" can be expanded to be either a creative content item (e.g., song) or an artist depending on the use case. The closer the orientation (dot product) a given user vector is to a particular item vector, the greater the likelihood that the user is interested in that particular item. A training process can be constructed to minimize the sum:

$$\Sigma_i (M_{u,s} - \vec{v}_u \cdot \vec{v}_i)^2$$

The dot product of a given user vector $\vec{v}_u$ and a given item vector $\vec{v}_i$ should be close to the original matrix element $M_{u,i}$. A perfect match between the matrix and dot product is not possible, however, this incongruity allows filling in the matrix with non-zero weights (the dot product between the user and item vectors) and effectively desparsifying the matrix. Items that a user might be interested in can therefore be predicted, even if that user never previously interacted with that item. Such predictions can be used to create a ranked list of items for each user, which is also useful for testing purposes.

In one embodiment, each artist can be represented by a distinct vector. The closer the vector representation of an artist is to another, the more similar these artists can be said to be. The same principle may be applied to other items.

CF can also be used in the context of logistic regression. Logistic regression has the advantage of giving a probability for a given user to listen to a given item i:

$$p_{u,i} = \frac{\exp(\vec{v}_u \cdot \vec{v}_i)}{\exp(\vec{v}_u \cdot \vec{v}_i) + 1}$$

where $p_{u,i}$ is the probability of user u listening to item i. In addition, a bias term can be added in the argument of the exponential above to account for popularity bias of given users and given items.

Item consumption can be power-law distributed with a small percentage of artists dominating the majority of item consumption. To exploit this trend, an aggregate collection of top artists' (by total consumption) artist-space vectors can be formed. A two-dimensional reduction on these artist-vectors can be performed. Alternatively, a three-dimensional or n-dimensional reduction can be performed.

At operation 120, the artist vectors are dimensionally reduced to a two-dimensional space. This can be accomplished in any number of ways. In one embodiment the reduction can be executed, for example, using a technique called t-distributed Stochastic Neighbor Embedding (t-SNE), which is particularly effective for its ability to generate well separated clusters. This results in a two-dimensional vector for each artist.

At operation 130 clusters are created using a mixture model. In one embodiment, a Dirichlet process mixture model can be used. A Dirichlet process mixture model provides a nonparametric process that does not require a predefined number of clusters but instead determines an optimal number of clusters automatically.

Once the clusters have been determined, at operation 140 the cluster centers be used in a mixture model to create: 1) categories for each artist, and 2) a probability of any artist belonging to any category, including those that are not the strongest match. This process allows for partial membership and consumption driven categories that do not depend on rigid genres.

Figure 2:
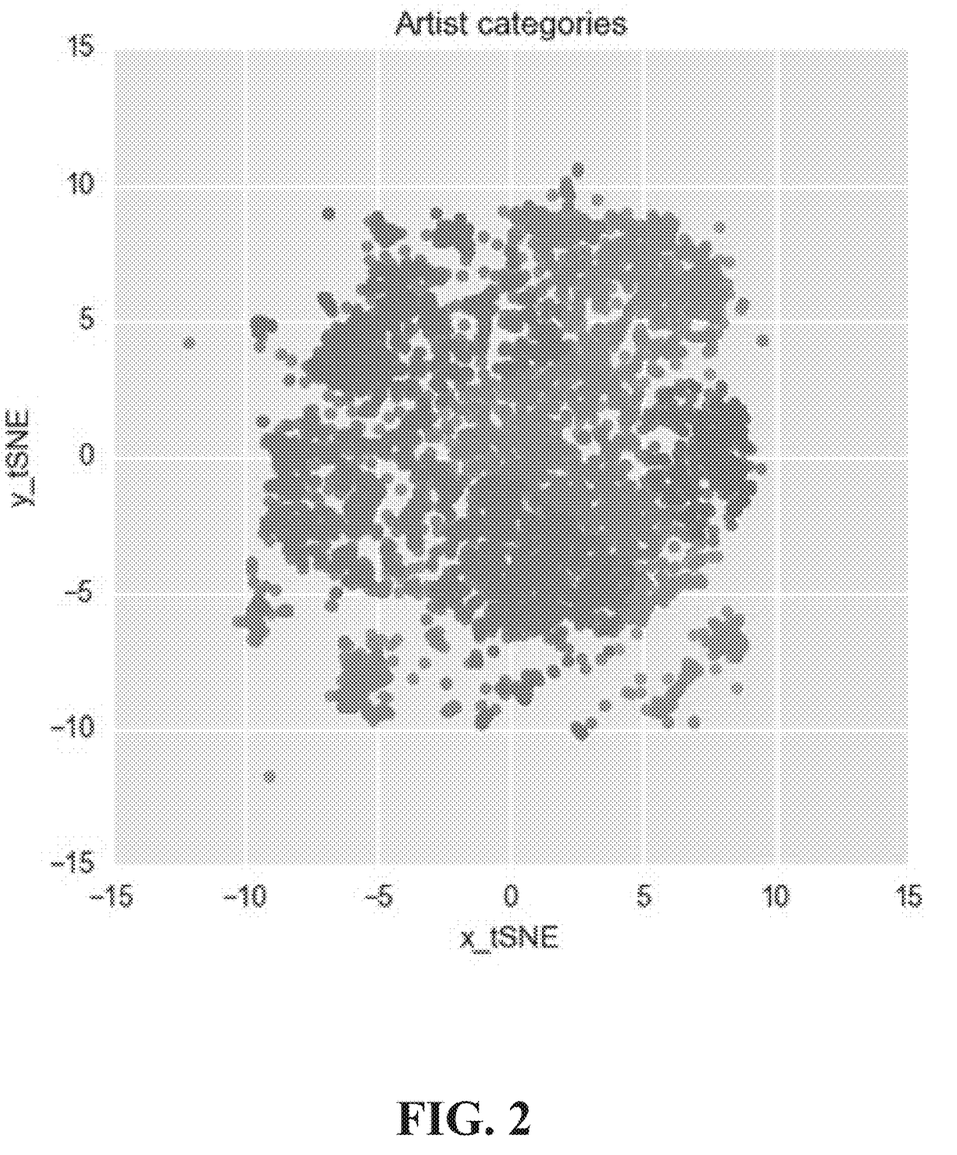
FIG. 2 shows Gaussian mixture generated clusters on artists' vectors according to an embodiment of the disclosed subject matter.

An example mixture model is a Gaussian mixture model. FIG. 2 shows Gaussian mixture generated clusters on artists' vectors. Using Gaussian mixture models, discrete categories can be determined for each artist based on consumption instead of being based on genre, and a probability of any artist belonging to any category can be determined. Furthermore, a probability of any artist belonging to any category that is not the strongest match for the artist can also be determined. The artist probability values can be used to determine partial membership in different categories.

Another benefit of using Gaussian mixture models is that Gaussian mixture models assume that artist vectors have been generated from a mixture of Gaussians with various means and variances. The closer an artist vector is to the mean of a particular category's Gaussian, the better the match the artist is for that category. Generally, an artist will receive a larger penalty for being farther from the mean, the smaller the variance of that particular Gaussian is. The weight for a particular artist belonging to a particular cluster i, can therefore be defined as:

$$weight_i = \exp\left(-\frac{(\vec{x} - \vec{\mu}_i)^2}{2\sigma_i^2}\right)$$

where x is the location of the t-SNE projected artist vector in question, $\mu_i$ is the center or mean vector of category i, and $\sigma_i$ is the standard deviation of cluster of category i. The weight for an artist per category can be viewed as a probability score for that artist belonging to a given category.

The artists are stored by their match to each category, including artists on the periphery. A random number weighted proportional to the weight of the artist in that category can be used to draw appropriate assignments.

A category consisting of all artists outside of the top artists list can also be created. This category can be considered the 'not popular' category. Less popular artists can be used as suggestions for users desiring less-popular options.

The weight of each category for each user can be stored in a N-d array (w_1, w_2, ..., w_N) representing the sampling of all categories by the user. The 'not popular' category can also be included in the array.

Each user's category preferences can be stored in a Dirichlet distribution. The Dirichlet distribution is the conjugate prior of the multinomial distribution. The weights can be initialized with the weights generated for all other users and the overall number with the typical standard deviation for a user. This functions as a Bayesian prior. As the user listens to more music, the weighting of their Dirichlet distribution is continually updated to reflect their preference and thus provide seamless category personalization to the users.

Accordingly, in the disclosed embodiments the number of categories can be determined nonparametrically, the categories can be created based on consumption instead of genre labels, and artists can be assigned partial members to categories, thereby accommodating artists who span several categories. While described in terms of artists and users, the same techniques can be applied to items and users as well. The resulting categories and assignments can be used to present a user with artists or items that the user will probably be interested in based on the user's alignment with other users' interest, and without any genre restriction.

Figure 3:
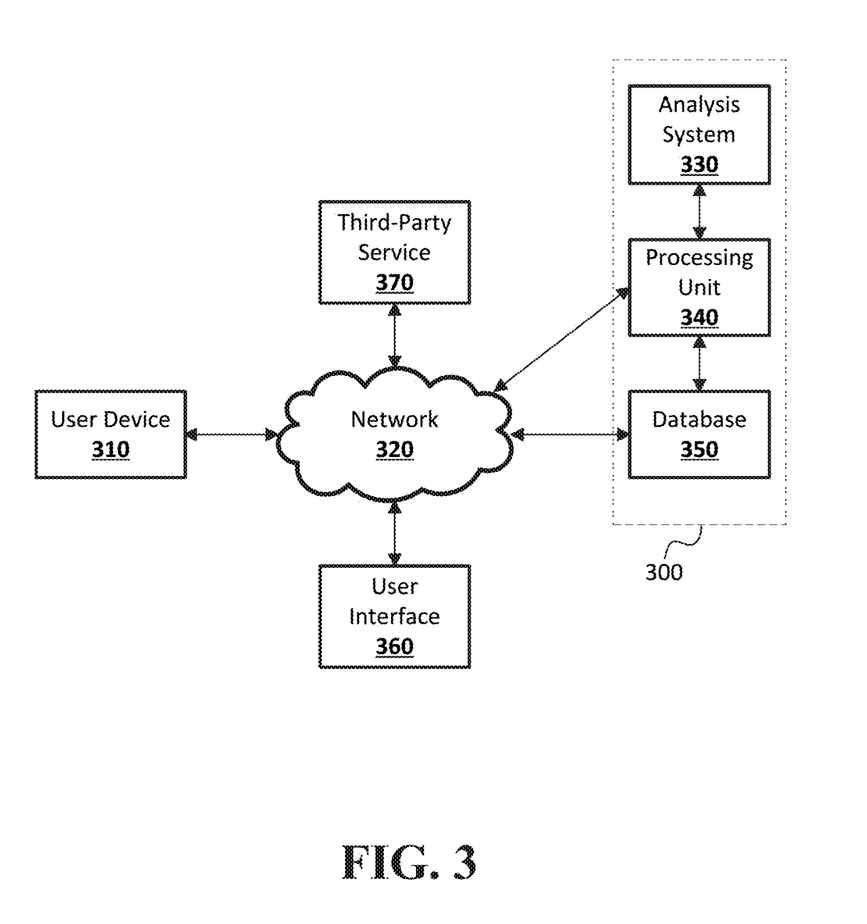
FIG. 3 shows an example network and system configuration according to an embodiment of the disclosed subject matter.

FIG. 3 shows an example arrangement that implements one or more of the disclosed embodiments to recommend and/or present artists or items to a user. A system 300 includes a processing unit 340 configured to implement the operations described above regarding FIG. 1. A database 350 can store data, such as content data, profile data, metadata and the like. An analysis system 330 may include a memory (not shown) to store instructions and be configured to provide specialized processing, such as where stored or acquired data is pre-processed by the analysis system 330 before delivery to the processing unit 340 or database 350. For example, analysis system 330 can implement a machine learning system and provide various prediction models, data analysis, or the like as described herein to system 300 or one or more other systems.

A user can access the system 300 via a user device 310, which can be a media player, computer, laptop, smart phone, wearable computing device, tablet computer, or the like, that can connect to one or more networks 320. The network 320 can be a local network, wide-area network, the Internet, or any other suitable communication network or networks, and can be implemented on any suitable platform including wired and/or wireless networks. The user device 310 can include one or more apps or programs that can communicate with one or more third-party services 370 and/or the system 300. In some cases, the user device 310 can communicate with a user-interface system 360, which can provide access to one or more components of system 300, such as database 350, analysis system 330, or the like. For example, the user interface 360 can be a user-accessible web page that provides data from one or more other computer systems. The user interface 360 can provide different interfaces to different clients, such as where a human-readable web page (e.g., a store front or service provider screen) is provided to a web browser client on a user device 310, and a computer-readable API or other interface is provided to system 300.

The user interface 360, system 300, and/or third-party services 370 can include multiple computer systems communicating via network 320, the Internet, or any other suitable network. Furthermore, system 300 may include one or more processing units 340, for example, as part of a distributed system such as a cloud-based computing system, content delivery system, or the like, which can also include or communicate with database 350 and/or user interface 360.

The system 300 can implement, for example, an online media store, a streaming media service, or the like. The items available for presentation can include songs, albums, videos, books, audiobooks or the like. In one embodiment, for example, database 350 can include a plurality of songs that can be streamed to user device 310 via network 320.

In addition, the system can be configured to collaborate with third-party services 370. For example, a first user can have an established account with a third party social network service. In this case, the first user may have identified one or more populations of other users that the first user would prefer to have recommendations based upon, e.g., 'classmates'. Referring to FIGS. 1 and 3, at operation 110 the collaborative filtering operation can be executed on a population that the first user selects, for example, based on the 'classmates' of the first user.

Moreover, other types of information that the user or a user population elects to make available can be included in the process 100 to further tailor the presentation/recommendation provided by system 300. For example, through data indicating likes, dislikes, ratings, etc., of various items and other users, the collaborative filtering matrix can be refined and customized per user to increase the probability of an item recommendation meeting the users' expectations of providing a favorable result. In other words, collaborative filtering matrix can be constructed based on any data obtained about the first user from a third party service.

Figure 4:
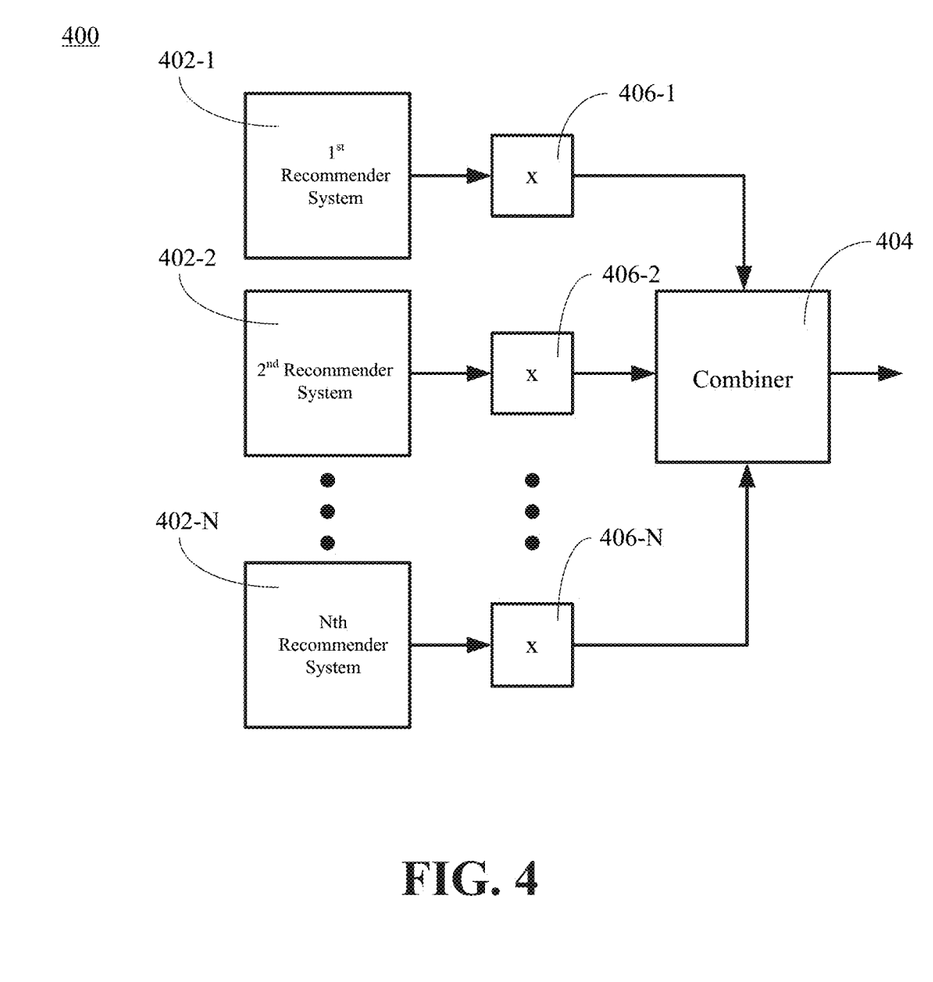
FIG. 4 shows a diagram of a hybrid recommender system according to an embodiment of the disclosed subject matter.

The disclosed system can be implemented as part of a hybrid recommender system that can include any of a variety of recommender systems and produce lists of recommendations based on a combination of the variety of recommender systems. FIG. 4 is a diagram illustrating an example of a hybrid recommender system 400. The hybrid recommendation system 400 can include, for example, a recommender system 402-1, one or more other recommender systems 402-2, ..., 402-N, and a combiner 404.

In an aspect, each of the recommender systems 402-1, 402-2, ..., 402-N can be different from each other of the recommender systems 402-1, 402-2, ..., 402-N. For example, the recommender system 402-1 can be any of a collaborative recommender system, a demographic recommender system, a content-based recommender system, a knowledge-based recommender system, a dynamic recommender system, an offline recommender system, or a context-aware recommender system. Likewise, the recommender system 402-2 can be any of a collaborative recommender system, a demographic recommender system, a content-based recommender system, a knowledge-based recommender system, a dynamic recommender system, an offline recommender system, or a context-aware recommender system. Recommendation inputs from each different recommender system can be weighted and combined to form an overall recommendation for content. A session metric, for example, can quantify the quality of recommendations that can be made based on in-session information. In-session information can be associated with a session window. A session window can be a portion of a content item consumption history of a user in which several content items have been consumed within a defined short period of time. The session metric can be used to adjust the weights by determining which outputs are most accurate for a given session for a given user. Further, the session metric can be recalculated each time the session window changes, i.e., one or more songs are added or deleted from the session (e.g., the songs advance as the user finishes listening), or the criteria applied to define the session window changes. For example the session window may be initially defined as in the above example, and then be dynamically redefined to include only songs that were listened to by a user with no longer than a twenty second pause between listens.

The hybrid recommender system 400 can include a weight 406-1 and one or more other weights 406-2, . . . , 406-N. Each of the weights 406-1, 406-2, . . . , 406-N can be associated with a corresponding one of the recommender systems 402-1, 402-2, . . . , 402-N. Each of the weights 406-1, 406-2, . . . , 406-N can be configured to receive, as an input, an output from the corresponding one of the recommender systems 402-1, 402-2, . . . , 402-N. Each of the weights 406-1, 406-2, . . . , 406-N can be combined to produce a single output. The output of each of the weights 406-1, 406-2, . . . , 406-N can be used in the combiner 404 to produce a single output.

In an aspect, if the hybrid recommender system 400 includes the weights 406-1, 406-2, . . . , 406-N, then, prior to an initial deployment of the hybrid recommender system 400, the hybrid recommender system 400 can be trained to determine each of the weight values via a technique such as a technique used in neural networks.

The combiner 404 can be configured to receive, as inputs, an output from each of the recommender systems 402-1, 402-2, . . . , 402-N and to produce a combined output. The output from each of the recommender systems 402-1, 402-2, . . . , 402-N can be used in the combiner 404. Alternatively, if the hybrid recommender system 400 includes the weights 406-1, 406-2, . . . , 406-N, then the output from each of the weights 406-1, 406-2, . . . , 406-N can an input to the combiner 404.

The combiner 404 can produce the combined output using any of a variety of techniques. For example, the combiner 404 can produce the combined output by aggregating the outputs from the recommender systems 402-1, 402-2, . . . , 402-N. For example, the combiner 404 can produce the combined output by numerically combining the weighted outputs from the recommender systems 402-1, 402-2, . . . , 402-N. For example, the combiner 404 can produce the combined output by using switches so that the combined output includes the output of one or more of the recommender systems 402-1, 402-2, . . . , 402-N, but excludes the output of one or more other the recommender systems 402-1, 402-2, . . . , 402-N.

This process can be performed to adjust correlation models used in a recommender system prior to an initial deployment of the recommender system. The process can be performed periodically to readjust the correlation models in response to changing tastes of a user. Furthermore, if the recommender system is a hybrid recommender system that includes multipliers so that different weight values can be applied to the outputs of the component recommender systems, then this process can be expanded to include training the hybrid recommender system both prior to an initial deployment and periodically to account for the subjective nature of what constitutes a "good" recommendation and the changing preferences of users over time.

It should be noted that in situations in which the systems discussed here utilize information about users provided by the users or a third-party service, the users can be provided with an opportunity to control whether programs or features collect user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a system as disclosed herein.

More generally, various embodiments of the presently disclosed subject matter can include or be embodied in the form of computer-implemented processes and apparatuses for practicing those processes. Embodiments also can be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also can be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Embodiments can be implemented using hardware that can include a processor, such as a general purpose microprocessor and/or an Application Specific Integrated Circuit (ASIC) that embodies all or part of the techniques according to embodiments of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as can be suited to the particular use contemplated.

The invention claimed is:

1. A method of automatically generating item recommendations for users in a system having a processor, and a database, and connected to a user device through a network, the method comprising:
populating a matrix at a first time for a plurality of users and a plurality of items, the matrix indicating an interest in one or more items of the plurality of items for one or more users of the plurality of users, the matrix stored in the database;
generating, using the processor, a first n-dimensional user vector and a first m-dimensional item vector based on the matrix, wherein each of n and m is at least 2;
computing, using the processor, a dot product of the user vector and the item vector;
populating the matrix at a subsequent second time based on the computed dot product;
generating, using the processor, a second user vector and a second item vector based on the subsequently-populated matrix; and
providing, using the processor, a recommendation of an item based on the second user vector and the second item vector to the user device via the network.

2. The method of claim 1, further comprising:
reducing, using the processor, the number of dimensions of the second user vector to x and the number of dimensions of the second item vector to y, such that x<n and y<m; and
generating, using the processor, a plurality of clusters based on the x-dimensional second user vector and the y-dimensional second item vector.

3. The method of claim 2, wherein reducing the number of dimensions of the second user vector and the number of dimensions of the second item vector is performed using t-distributed stochastic neighbor embedding (t-SNE).

4. The method of claim 2, further comprising:
calculating, using the processor, a cluster center for one or more clusters of the plurality of clusters; and
calculating, using the processor, a first probability that an item of the plurality of items belongs to a first cluster of the plurality of clusters.

5. The method of claim 4, wherein the probability that and item of the plurality of items belongs to a cluster i of the plurality of clusters calculated using the formula:

$$probability_i = \exp\left(-\frac{(\vec{x} - \vec{\mu_i})^2}{2\sigma_i^2}\right)$$

where x is a location of a projected item vector, $\mu_i$ is a center or mean vector of the cluster i, and $\sigma_i$ is a standard deviation of the cluster i.

6. The method of claim 4, further comprising:
calculating, using the processor, a second probability that the item of the plurality of items belongs to a second cluster of the plurality of clusters.

7. The method of claim 1, wherein the recommendation of an item is additionally based on a probability $p_{u,i}$ of a user u consuming an item i determined as:

$$p_{u,i} = \frac{\exp(\vec{v}_u \cdot \vec{v}_i)}{\exp(\vec{v}_u \cdot \vec{v}_i) + 1}.$$

8. The method of claim 7, further comprising adding a bias term in the argument of the exponential to reduce the effects of popularity bias.

9. The method of claim 1, wherein the first n-dimensional user vector and the first m-dimensional item vector are generated using collaborative filtering.

10. The method of claim 1, further comprising:
generating category preferences for a user and storing the preferences in a Dirichlet distribution;
assigning weights to the Dirichlet distribution; and
updating the weights as the user uses items of the plurality of items.

11. A non-transitory computer-readable storage medium comprising instructions that, when executed, cause a processor of a computing device to:
populate a matrix at a first time for a plurality of users and a plurality of items, the matrix indicating an interest in one or more items of the plurality of items for one or more users of the plurality of users, the matrix stored in a database;
generate a first n-dimensional user vector and a first m-dimensional item vector based on the matrix, wherein each of n and m is at least 2;
compute a dot product of the user vector and the item vector;
populate the matrix at a subsequent second time based on the computed dot product;
generate a second user vector and a second item vector based on the subsequently-populated matrix; and
provide a recommendation of an item based on the second user vector and the second item vector to a user device via a network.

12. The medium of claim 11, further comprising instructions to cause the processor to:
reduce the number of dimensions of the second user vector to x and the number of dimensions of the second item vector to y, such that x<n and y<m; and
generate a plurality of clusters based on the x-dimensional second user vector and the y-dimensional second item vector.

13. The medium of claim 12, further comprising instructions to cause the processor to:
calculate a cluster center for one or more clusters of the plurality of clusters; and
calculate a first probability that an item of the plurality of items belongs to a first cluster of the plurality of clusters.

14. The medium of claim 13, wherein the probability that and item of the plurality of items belongs to a cluster i of the plurality of clusters calculated using the formula:

$$probability_i = \exp\left(-\frac{(\vec{x} - \vec{\mu_i})^2}{2\sigma_i^2}\right)$$

where x is a location of a projected item vector, $\mu_i$ is a center or mean vector of the cluster i, and $\sigma_i$ is a standard deviation of the cluster i.

15. The medium of claim 13, further comprising instructions to cause the processor to:
calculate a second probability that the item of the plurality of items belongs to a second cluster of the plurality of clusters.

16. The medium of claim 11, wherein the recommendation of an item is additionally based on a probability $p_{u,i}$ of a user u consuming an item i determined as:

$$p_{u,i} = \frac{\exp(\vec{v}_u \cdot \vec{v}_i)}{\exp(\vec{v}_u \cdot \vec{v}_i) + 1}.$$

17. The medium of claim 16, further comprising instructions to cause the processor to add a bias term in the argument of the exponential to reduce the effects of popularity bias.

18. The medium of claim 12, wherein reducing the number of dimensions of the second user vector and the number of dimensions of the second item vector is performed using t-distributed stochastic neighbor embedding (t-SNE).

19. The medium of claim 11, wherein the first n-dimensional user vector and the first m-dimensional item vector are generated using collaborative filtering.

20. The medium of claim 11, further comprising instructions to cause the processor to:
   generate category preferences for a user and storing the preferences in a Dirichlet distribution;
   assign weights to the Dirichlet distribution; and
   update the weights as the user uses items of the plurality of items.

\* \* \* \* \*